US011370525B2

(12) United States Patent
Bishop

(10) Patent No.: US 11,370,525 B2
(45) Date of Patent: Jun. 28, 2022

(54) WING ASSEMBLY TENSION JOINT AND METHOD OF ASSEMBLY

(71) Applicant: AIRBUS OPERATIONS LIMITED, Bristol (GB)

(72) Inventor: Benjamin Bishop, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 252 days.

(21) Appl. No.: 16/572,968

(22) Filed: Sep. 17, 2019

(65) Prior Publication Data
US 2020/0140059 A1  May 7, 2020

(30) Foreign Application Priority Data
Sep. 19, 2018 (GB) ..................... 1815274

(51) Int. Cl.
*B64C 3/28* (2006.01)
*B64C 3/18* (2006.01)

(52) U.S. Cl.
CPC ............ *B64C 3/28* (2013.01); *B64C 3/187* (2013.01)

(58) Field of Classification Search
CPC ... B64C 3/187; B64C 3/26; B64C 3/28; B64F 5/10; F16B 39/00
USPC ........................................ 244/124
See application file for complete search history.

(56) References Cited

U.S. PATENT DOCUMENTS

| 3,096,826 | A | * | 7/1963 | Amer | ...................... | B64C 27/18 |
| | | | | | | 416/20 R |
| 5,039,032 | A | * | 8/1991 | Rudolph | ............... | B64C 23/069 |
| | | | | | | 244/35 R |
| 6,551,428 | B1 | * | 4/2003 | Guillou | ..................... | B64F 5/10 |
| | | | | | | 156/91 |
| 2009/0283639 | A1 | | 11/2009 | Ackermann et al. | | |
| 2010/0065687 | A1 | * | 3/2010 | Douglas | ................. | B64C 3/185 |
| | | | | | | 244/130 |

(Continued)

FOREIGN PATENT DOCUMENTS

| CN | 201395244 | 2/2010 |
| DE | 102015105298 | 10/2016 |
| EP | 3 421 355 | 1/2019 |

OTHER PUBLICATIONS

Extended European Search Report for European Application No. 19198076.2, 11 pages, dated Feb. 10, 2020.

(Continued)

*Primary Examiner* — Brady W Frazier
(74) *Attorney, Agent, or Firm* — Nixon & Vanderhye P.C.

(57) ABSTRACT

A wing assembly is disclosed. The wing assembly includes a main structure having a first contact face and a first recess arranged to receive a portion of a tension bolt; and a modular edge having a second contact face and a second recess arranged to receive a portion of the tension bolt. The modular edge is pivotally mounted on the main structure for rotation between an installation position and an operational position in which the modular edge is aligned with the main structure to form at least part of an edge of the wing assembly. The wing assembly is arranged such that, when the modular edge is in the operational position, tension in a tension bolt received in the first and second recesses acts to press the first and second contact faces together, thereby forming a tension joint that resists pivoting of the modular edge relative to the main structure.

14 Claims, 12 Drawing Sheets

(56) References Cited

U.S. PATENT DOCUMENTS

| | | | |
|---|---|---|---|
| 2013/0001360 A1* | 1/2013 | Wildman | B64C 3/28 244/123.1 |
| 2013/0146711 A1* | 6/2013 | Stewart | B64C 3/185 244/123.1 |
| 2014/0115869 A1* | 5/2014 | DeLand | B25B 23/0085 29/525.02 |
| 2015/0048207 A1* | 2/2015 | Williams | B64C 3/18 244/123.7 |
| 2016/0332720 A1 | 11/2016 | Whitlock et al. | |
| 2017/0327245 A1* | 11/2017 | Salisbury | B64C 3/26 |
| 2018/0072401 A1* | 3/2018 | Uckert | B64C 3/48 |
| 2018/0155004 A1* | 6/2018 | Woolcock | B64C 3/185 |

OTHER PUBLICATIONS

Combined Search and Examination report for GB1815274.4, dated Mar. 8, 2019, 7 pages.

* cited by examiner

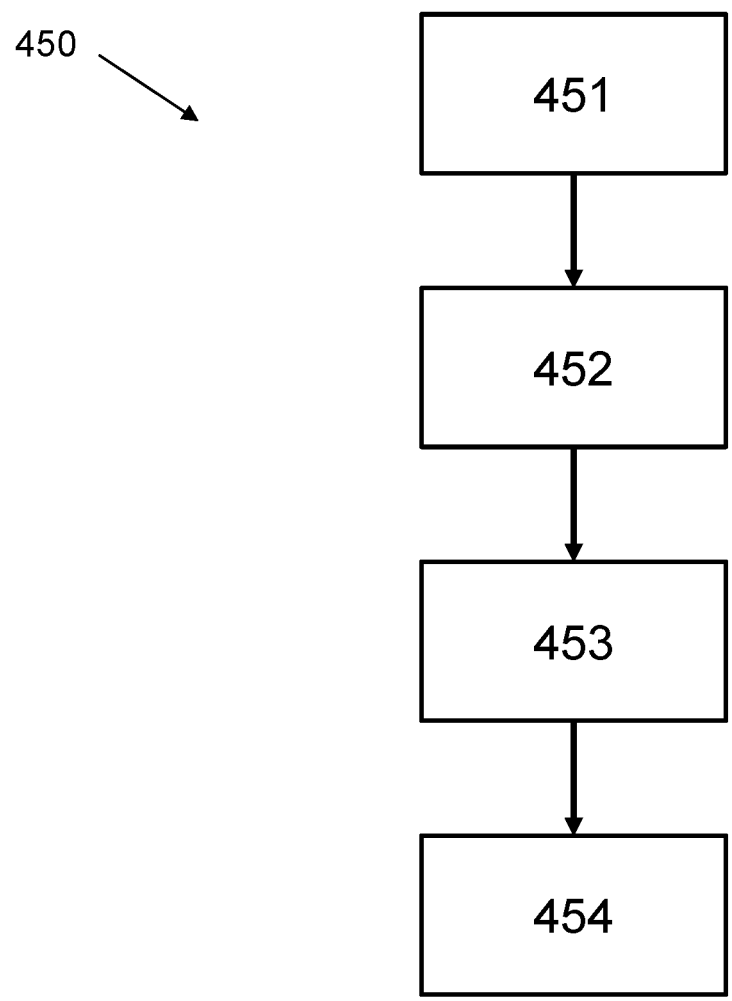

WING ASSEMBLY TENSION JOINT AND METHOD OF ASSEMBLY

CROSS RELATED APPLICATION

This application claims priority to United Kingdom (GB) Patent Application 1815274.4, filed Sep. 19, 2018, the entire contents of which are hereby incorporated by reference.

BACKGROUND OF THE INVENTION

The present invention relates to a wing assembly. More particularly, but not exclusively, this invention concerns a wing assembly comprising a modular leading and/or trailing edge sub-assembly (a modular edge), a modular edge suitable for use in such a wing assembly, a wing box suitable for use in such a wing assembly, an aircraft including such a wing assembly, and a method of installing a modular edge.

In a typical construction, a wing may comprise a wing box having front and rear spars, upper and lower covers extending between the spars and one or more wing ribs extending between the spars and covers. Fixed leading and trailing edge structures such as the leading edge D-nose may be attached to the wing box. In order to provide the desired aerodynamic performance, the wing must closely conform to its design shape. The shapes of the various components are closely controlled within predetermined tolerances but it may still be necessary to use shims and/or fettling and/or other techniques during assembly to compensate for deviations from those tolerances (known as tolerance gaps) which impact on the overall shape of the wing and therefore impact on its aerodynamic performance. This may be a time consuming process which impacts on the rate at which wings can be manufactured. Once an aircraft is in use, if access is required to an internal element of the wing, it may be necessary to partially disassemble the wing. During reassembly care must be taken to ensure the wing conforms to the design shape once reassembled, particularly if shims have been used. This may increase the time and/or effort associated with the maintenance of such wings.

The present invention seeks to mitigate one or more of the above-mentioned problems. Alternatively or additionally, the present invention seeks to provide an improved structure for a wing assembly that facilitates more efficient manufacture and/or maintenance.

SUMMARY OF THE INVENTION

According to a first aspect of the invention, there is provided a wing assembly. The wing assembly may comprise a main structure comprising a first contact face and a first recess arranged to receive a portion of a tension bolt. The wing assembly may comprise a modular edge comprising a second contact face and a second recess arranged to receive a portion of the tension bolt. The modular edge may be pivotally mounted on the main structure for rotation between an installation position, in which the first and second contact faces are spaced apart, and an operational position, in which the first and second contact faces are abutting and the modular edge is aligned with the main structure to form at least part of an edge of the wing assembly. The wing assembly may be arranged such that, when the modular edge is in the operational position, tension in a tension bolt received in the first and second recesses acts to press the first and second contact faces together, thereby forming a tension joint that resists pivoting of the modular edge relative to the main structure.

Thus, rotation of the modular edge relative to the main structure away from the operational position may be prevented by a tension joint comprising a tension bolt received in the first and second recesses and arranged to press a first contact face and a second contact face together to resist pivotal rotation of the modular edge. A tension joint may be defined as a joint in which separation of the joined components is resisted by tension in the bolt, as opposed to shear.

The use of a modular edge may improve manufacturing efficiency by allowing the modular edge to be manufactured in a standardised manner and separately from the remainder of the wing assembly. The above attachment arrangement may make it easier to accommodate tolerance gaps in or between the main structure and/or modular edge as the alignment between the main structure and modular edge can be adjusted using the mounting point and tension bolt. Use of a modular edge can also enable quick and efficient assembly of the wing by reducing the number fasteners to the main structure. Additionally or alternatively, being able to rotate the modular edge from the operational position to the installation position may make in-service inspection and maintenance easier by facilitating access to the interior of the wing assembly. Using a tension joint may provide a mechanically simple and reliable manner of holding the modular edge in the operational position when mounted on the main structure.

It will be understood by the skilled person that the term modular refers to the use of independent units or sub-assemblies (i.e. modules) to construct a more complex structure. Thus a modular edge may be defined as a sub-assembly comprising structure defining an edge, for example a leading edge or trailing edge, of a wing. The modular edge may comprise a sub-assembly providing a structure defining the aerodynamic shape of an edge, for example the leading or trailing edge, of the wing. The modular edge may comprise one or more, for example a plurality of, ribs (hereafter edge-ribs). In the case that the modular edge is a leading edge, an edge-rib may be a d-nose rib. The modular edge may comprise an outer skin. The outer skin may be supported by the edge-rib(s). The outer skin may extend from the upper side of the modular edge to the lower side of the modular edge (it will be appreciated that upper and lower refer to the orientation of the modular edge in flight). The outer skin may be a curved outer skin. The modular edge may be configured to be mounted to the main structure at the Final Assembly Line (FAL). The modular edge may comprise one or more of lights, electrical harness(es), hydraulic lines and/or de-icing equipment.

The tension joint may comprise a tension bolt, a first recess, a second recess, a first contact face and a second contact face. The tension joint may resist pivoting of the modular edge in both directions (clockwise and anticlockwise) relative to the main structure.

The wing assembly may form at least part of a wing of an aircraft.

The modular edge is aligned with the main structure to form at least part of the leading edge or trailing edge of the wing when the modular edge is in the operational position. Thus, the modular edge may be a modular leading edge and/or a modular trailing edge. It may be that the modular edge is configured to remain in the operational position when the aircraft is in flight. Thus, it may be that the modular edge is not a flap, slat or other leading or trailing edge device that moves during normal aircraft operations, for example during flight.

The first recess may be formed in, for example extend from, the first contact face. The second recess may be formed in, for example extend from, the second contact face. Alternatively, the first recess may be spaced apart from the first contact face and/or the second recess may be spaced apart from the second contact face. A portion of an inner surface of the first and/or second recess may comprise a screw thread configured to engage with the screw thread of the tension bolt. Thus, the inner surface may comprise a male and/or female thread. The tension bolt may comprise a male (or female) thread while the first and second recesses comprise a female (or male) thread such that, in use, the tension bolt forms a threaded engagement with the first and second recess. The first and/or second recess may have a closed end. For example, the first and/or second recess may be a closed ended (or blind) bore. The first and/or second recess may be open at both ends. For example, the first and/or second recess may be a bore extending through the depth of a structure (a through bore).

The main structure may comprise at least one wing rib. The main structure may comprise one or more wing spars and/or one or more wing stringers. The main structure may comprise one or more covers, for example an upper and/or lower cover. The at least one wing rib may be configured to support a portion of the upper and/or lower cover(s). The main structure may comprise a wing box comprising one or more of the following; wing rib(s), wing spar(s), wing stringer(s), cover(s). The main structure may be a wing tip configured to be mounted to the outboard end of a wing. The main structure may a portion of the main body of a wing.

The first contact face may be located on the wing rib. The first contact face may comprise a substantially planar surface, for example a substantially planar surface formed on a portion of the wing rib.

The first recess may be formed in the wing rib. The first recess may extend into the body of the wing rib in a direction perpendicular to a surface of the wing rib, for example perpendicular to a first contact face located on the wing rib. Providing the first recess in the body of the wing rib may facilitate a mechanically simple and compact tension joint arrangement.

Alternatively, the main structure may comprise a barrel nut mounted on the wing rib. The first recess may be formed in the barrel nut. The barrel nut may comprise an elongate body having a threaded recess (e.g. the first recess). The barrel nut may be mounted in a hole in the wing rib. For example substantially all of the elongate body may be received in the hole. In that case, a linking recess may extend through a portion of the wing rib to the barrel nut such that a portion of the tension bolt may pass through the linking recess and be received in the first recess formed in the barrel nut. Providing the first recess in a barrel nut may facilitate a more compact tension joint arrangement and/or allow better load distribution within the main structure.

The second contact face may be located on the edge rib. The second contact face may comprise a substantially planar surface, for example a substantially planar surface formed on a portion of the edge rib.

The second recess may be formed in the edge rib. The second recess may extend into the body of the edge rib in a direction perpendicular to a surface of the edge rib, for example perpendicular to a second contact face located on the edge wing rib. Providing the second recess in the body of the wing rib may facilitate a mechanically simple and compact tension joint arrangement.

The modular edge may comprise a spigot. The spigot may be mounted on an edge rib. The second recess may be formed in the spigot. The spigot may comprise an elongate body having a threaded recess (e.g. the second recess) extending thorough it in a direction substantially perpendicular the longitudinal axis of the body. The spigot may be mounted on the edge rib at a first end of the spigot. The second contact face may be located on the spigot, for example on the surface of the elongate body. The second contact face may comprise a portion, for example a flat portion, of the outer circumference of the elongate body of the spigot.

The spigot may be mounted on the modular edge, for example on an edge-rib, for rotation relative to the modular edge or edge-rib. The spigot may be mounted for rotation relative to the modular edge or edge-rib about an axis substantially parallel to the edge of the wing assembly. The spigot may be mounted for rotation over a range of ±5 degrees or less, for example ±3 degrees or less, for example ±1 degree or less. Provision of a spigot having a small amount of rotational freedom of movement may allow the tension joint to be 'self-aligning', that is, rotation of the spigot may allow relative movement of the contact faces to provide better alignment of the faces when they are in an abutting relationship. Thus, the rotational freedom of movement may allow for accommodation of misalignment between the modular edge and main structure and/or improved load distribution across the corresponding contact faces.

It may be that the first contact face and first recess are formed in the wing rib and the second contact face and second recess are formed in a spigot mounted on the edge rib. Alternatively, it may be that the first contact face and first recess are formed in a barrel nut mounted on the wing rib and the second contact face and second recess are formed in the edge rib.

The modular edge may be pivotally mounted on the main structure for rotation about an axis lying substantially parallel to the edge of the wing. The modular edge may be pivotally mounted on the main structure for rotation about an axis lying substantially parallel to the major axis of a wing spar (if present).

The modular edge may be pivotally mounted on the main structure by one or more fasteners, for example one or more attachment pins or bolts. The fastener may comprise an elongate body. The fastener may comprise a head located at one end of the elongate body. The wing assembly may be arranged such that each fastener, for example each attachment bolt or pin, constrains the leading edge relative to the main structure in all degrees of freedom except rotation about a longitudinal axis of the fastener. Thus, the fastener(s) may be the primary element(s) by which the modular edge is mounted on the main structure of the wing. It will be appreciated that this is in contrast to the tension bolt which is configured only to resist pivoting of the modular edge relative to the main structure of the wing. Thus, the tension joint of which the bolt forms a part may be sized on the basis of the torque load acting to rotate the modular edge about the fastener. This may allow the tension bolt and/or tension joint to be smaller and thereby allow the invention to be used in, for example, thinner areas of the wing. The wing assembly may be arranged such that the or each fastener permits rotation of the modular edge relative to the main structure around an axis lying substantially parallel to the edge of the wing. An attachment bolt may comprise an elongate body, with a male or female screw thread formed along at least a portion of the elongate body. An attachment pin may comprise an elongate body, with a bearing (e.g. non-threaded surface) extending along at least a portion of the elongate body.

The tension bolt may comprise a head and an elongate body extending therefrom. A male or female screw thread may be formed along at least a portion of the elongate body. The tension joint may be configured such that the second recess is located between the first recess and the head when the bolt is received in the first and second recesses.

The wing assembly may be configured such that the head of the tension bolt is located on the lower side of the wing assembly when the modular edge is in the operational position and the bolt is received in the first and second recesses. Thus, the wing assembly may be configured such that the tension bolt can be accessed through a hole in a lower cover of the wing assembly. Providing a modular edge in which the tension bolt is accessed via the underside of the wing may reduce the impact of the head on the aerodynamic performance of the wing compared to incorporating an equivalent feature into an upper cover of the wing assembly.

Alternatively, the wing assembly may be configured such that the head of the tension bolt is located on the upper side of the wing when the modular edge is in the operational position and the bolt is received in the first and second recesses. Thus, the wing assembly may be configured such that the tension bolt can be accessed through a hole in an upper cover of the wing assembly. Providing a modular edge in which the tension blot is accessed via the upper side of the wing may facilitate the use of a modular edge in thin regions of the wing where space is limited.

A first and second contact face may be said to form a corresponding pair of contact faces if said contact faces are in an abutting relationship when the modular edge is in the operational position. The first and second contact faces of a corresponding pair may have a complementary shape. For example, the shape of the first and second contact faces may be such that when said contact faces are in an abutting relationship one or both of the contact faces is in contact with the other contact face over the majority of its surface area, for example substantially all of its surface area. Providing a first and second contact face shaped to conform to one another may provide improved robustness by reducing point loads in the tension joint. It may be that the first contact face and the second contact face are both flat.

It may be that in the operational position, the outer skin of the modular edge is aligned with the upper and/or lower covers of the main structure. It may be in the installation position, the outer skin of the modular edge is discontinuous with the upper and/or lower covers of the main structure. It may be that in the installation position the modular edge is rotated relative to its operational position, and with respect to the main structure, such that a portion of the main structure that is not accessible when the edge is in the operational position may be accessed.

The main structure may comprise a plurality of wing ribs, for example more than 4 ribs, for example more than 10 ribs, for example up to 20 ribs. The modular edge may be pivotally mounted on each of the wing ribs. The wing assembly may be configured such that a tension joint is formed between the modular edge and each wing rib. Thus, the wing assembly may include a plurality of tension joints, each tension joint comprising a first recess and a first contact face forming part of the main structure, a second recess and a second contact face forming part of the modular edge and a tension bolt, each tension bolt being received in a corresponding pair of first and second recesses. It may be that a single wing assembly comprises more than one type of tension joint arrangement. For example the wing assembly may comprise a first tension joint comprising a first contact face and a first recess formed in a wing rib and a second contact face and second recess formed in a spigot mounted on and edge rib, and a second tension joint comprising a first contact face and a first recess formed in a barrel nut mounted on a wing rib and a second contact face and a second recess are formed in the edge rib. Provision of different types of tension joint in the same wing assembly may allow the design of the tension joint to be varied in response to the constraints, for example, the space constraints that apply in different areas of the wing. The second tension joint may be located outboard of the first tension joint. The wing assembly may comprise one or more further tension joints of either type. The wing assembly may comprise at least three tension joints. Providing at least three tension joints allows the modular edge to bend with the main structure.

According to a second aspect of the invention there is provided a modular edge suitable for use as the modular edge of any other aspect. The modular edge may for example be provided together with the tension bolt of the wing assembly of the first aspect of the invention.

According to a third aspect of the invention there is provided an aircraft comprising a wing assembly according to any other aspect. The aircraft may be a passenger aircraft, for example an aircraft configured to carry more than 50 passengers, for example more than 100 passengers.

According to a fourth aspect of the invention there is provided a method of assembling a wing assembly. The wing assembly may comprise one or more of: a main structure comprising a first recess and a first contact face, a modular edge configured to form part of the leading or trailing edge of the wing assembly, the modular edge comprising a second recess and a second contact face, and a tension bolt. The method may comprise one or more of the following steps:

mounting the modular edge to the main structure in an installation position, in which the first and second contact faces are spaced apart;

rotating the modular edge from the installation position to an operational position, in which the first contact face and the second contact face are abutting;

inserting the tension bolt into the first and second recesses;

tensioning the tension bolt to press the first and second contact faces together thereby forming a tension joint that resists rotation of the modular edge away from the operational position.

After the bolt has been tensioned, the method may comprise operating the aircraft, for example flying the aircraft. It may be that during such operation of the aircraft, the first and second contact faces remain in abutting relation. The method may comprise not rotating the modular edge away from the operational position while the aircraft is in flight.

The method may further comprise a step of carrying out a maintenance action on the wing assembly. The step of carrying out a maintenance action may be carried out with a frequency of less than once a day, for example less than once a week for example less than once a month. The step of carrying out a maintenance action may comprise one or more of the following steps:

releasing the tension bolt; and then removing the tension bolt from the first and second recesses; and then rotating the modular edge from the operational position to the installation position; and then carrying out a maintenance action, for example an inspection, replacement and/or service; and then rotating the modular edge from the installation position to the operational position; and then reinserting the tension bolt into the first and second recesses; and then retensioning the tension bolt to press the first and second contact faces together thereby forming a tension joint that resists rotation of the modular edge away from the operational position.

Thus, methods in accordance with the present invention may facilitate efficient maintenance of the wing assembly by providing access to the interior of the wing assembly when the modular edge is in the installation procedure, without the need to significantly disassemble the wing assembly.

The step of tensioning (and/or retensioning) the tension bolt may comprise tightening the bolt until a predetermined torque loading is reached. The step of tensioning (and/or retensioning) the tension bolt may draw the first and second contact faces together, and then clamp and/or press those faces together. Thus, movement of the modular edge relative to the wing box may be prevented in one direction by the contact between the first and second contact faces.

The step of rotating the modular edge to an operational position may comprise rotating the modular edge through an angle of at least 45 degrees, for example more than 80 degrees, for example 90 degrees.

The step of mounting the modular edge to the main structure may comprise connecting the modular edge to the main structure using one or more attachment bolts. The step of rotating the modular edge to the operational position may comprise rotating the modular edge about the attachment bolt(s).

According to a fifth aspect of the invention, there is provided a wing assembly forming at least part of a wing of an aircraft. The wing assembly comprises a wing body having a first surface and a modular edge having a second surface. The modular edge may be configured to form at least part of one of a leading edge of the wing assembly and a trailing edge of the wing assembly. The modular edge may be clamped against the wing body by at least one releasable fixing held in tension, causing the first and second surfaces to be held together in abutting relation. The wing assembly modular edge may be mounted on the wing body for movement away from the wing body, when the fixing is released, to a position in which the modular edge remains connected to the wing body but with first and second surfaces being held in spaced apart relation.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 12 shows a flow chart illustrating the steps of a method according to a fourth embodiment of the invention;

DETAILED DESCRIPTION

Figure 1:
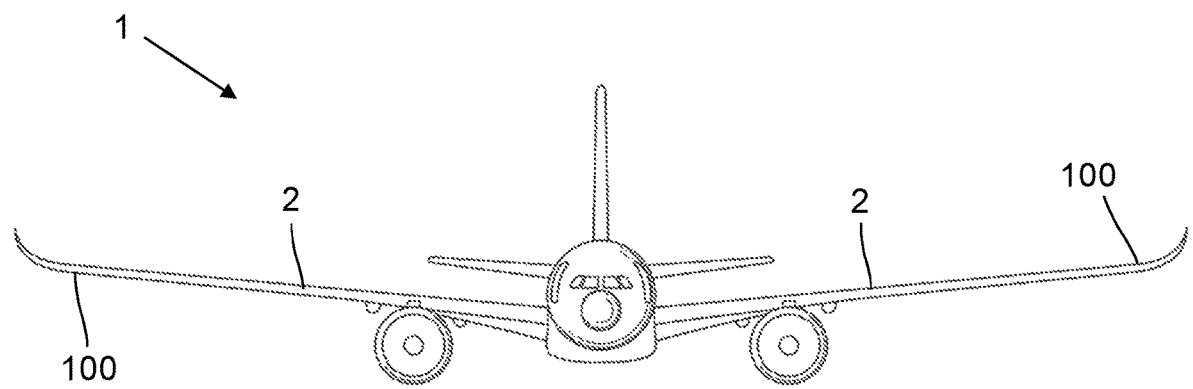
FIG. 1 shows a front view of an aircraft according to a first embodiment of the invention.
Figure 2:
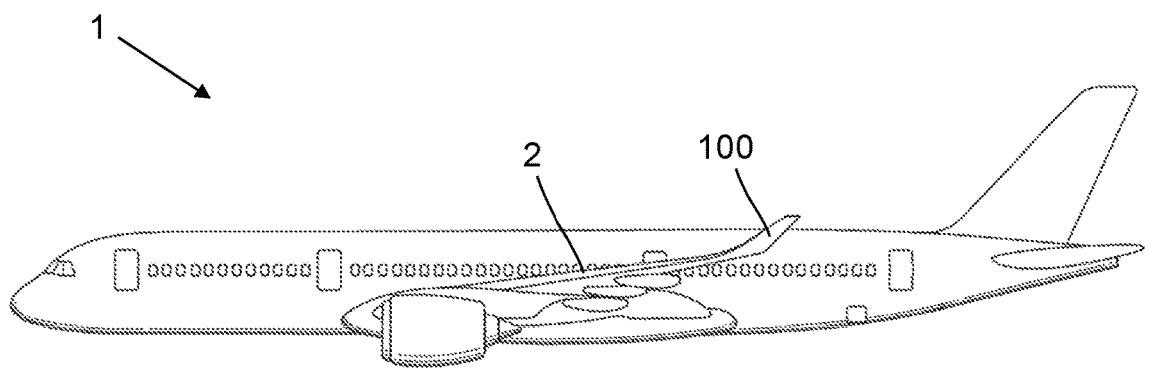
FIG. 2 shows a side view of the aircraft of FIG. 1.

FIG. 1 shows a front view of an aircraft 1 having two fixed wings 2, each wing 2 having a wing tip 100 in accordance with a first embodiment of the invention located at its outboard end. FIG. 2 shows a side view of the aircraft 1 of the first embodiment.

Figure 3:
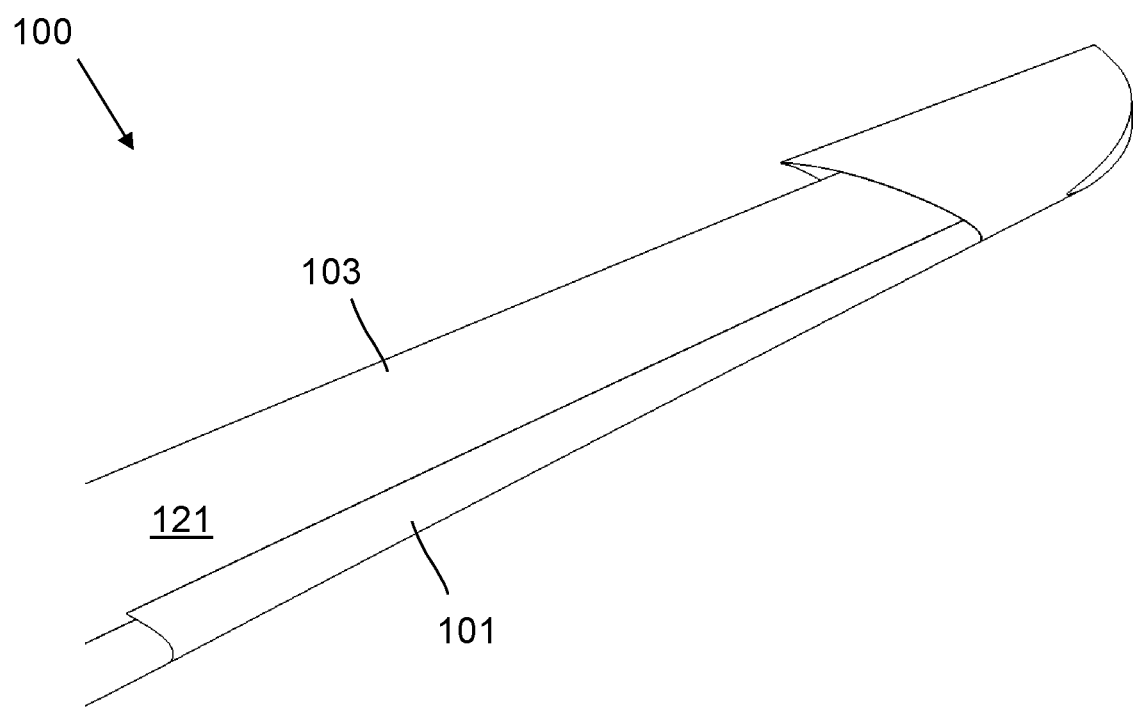
FIG. 3 shows a perspective view of a portion of a wing tip according to the first embodiment of the invention, when the modular leading edge is in the operational position at the leading edge.
Figure 3A:
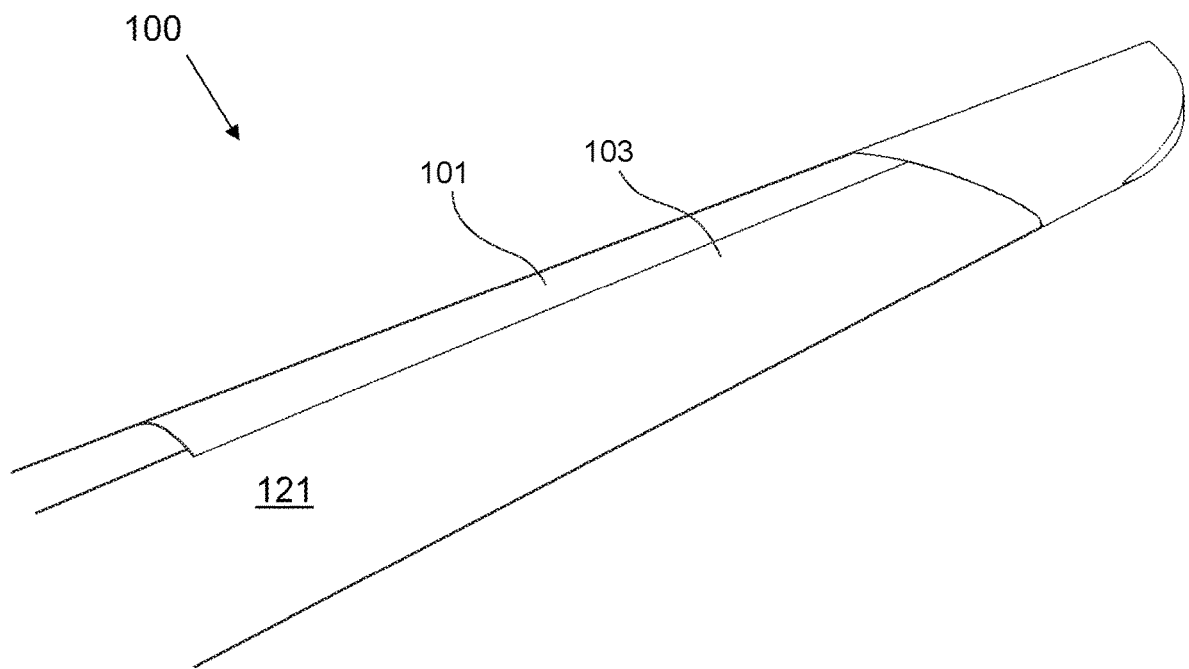
FIG. 3A shows a perspective view of a portion of a wing tip according to the first embodiment of the invention, when the modular leading edge is in the operational position at the trailing edge.

FIG. 3 shows a close up view of a portion of the wing tip 100 of the first embodiment. The wing tip 100 comprises a wing box 103 which, in use, is mounted at one end to the outer end of the main body of the wing 2. The wing box has an upper cover 121. A modular leading edge 101 is mounted on the wing box 103 and extends along the front edge of the wing box 103 (the lower edge of the wing tip 100 as shown in FIG. 3) to form the leading edge of the wing tip 100. In FIG. 3, the modular leading edge is aligned with the wing box 103 and upper cover 121 so that it forms the leading edge of wing tip 100. The modular leading edge may therefore be said to be in the operational position in FIG. 3.

Figure 4:
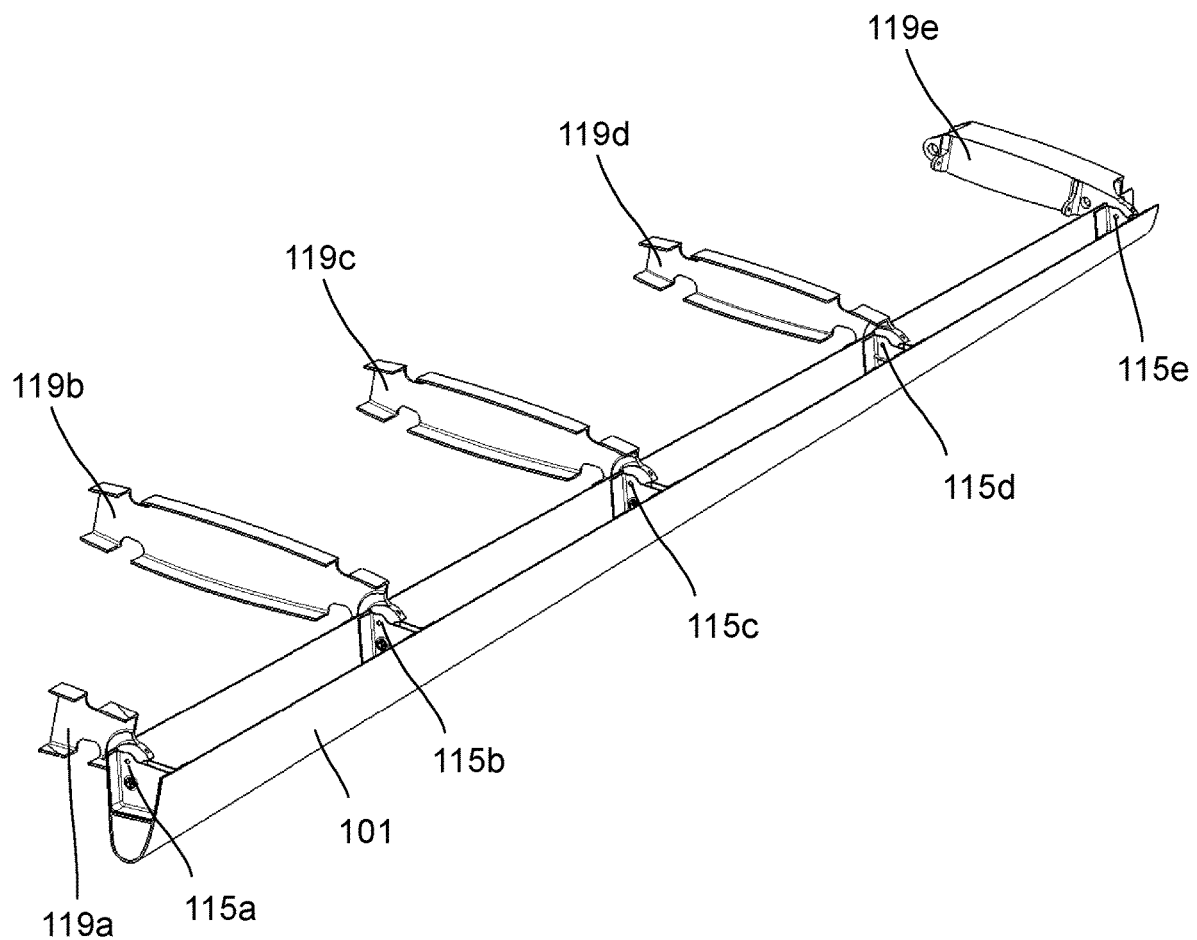
FIG. 4 shows a perspective view of a portion of the wing tip of FIG. 3, when the modular leading edge is in the installation position.

FIG. 4 shows a perspective view of a portion of the wing tip 100 of the first embodiment with the upper cover 121 of wing box 103 removed. The modular leading edge 101 is rotated downwards by 90 degrees relative to the wing box 103 and the position of the edge 101 in FIG. 3. The modular leading edge may therefore be said to be in the installation position in FIG. 4. The wing tip 100 has five wing ribs 119a-e. The modular leading edge is mounted to each rib 119a-e via an attachment bolt 115a-e, each attachment bolt 115a-e connecting a wing-box rib 119a-e to a corresponding rib 109a-e of the modular leading edge 101. When in the installation position of FIG. 4 the ribs 109a-e of the modular leading edge 101 are rotated by approximately 90 degrees with respect to their position in the operational position as shown in FIG. 3. Thus, the ribs 109a-e of modular leading edge 101 are perpendicular to the ribs 119a-e of the wing box 103 (in the installation position).

Wing tips in accordance with the present example embodiment may improve the efficiency of manufacture of an aircraft wing by allowing the leading edge structure to be provided as a separate sub-assembly (the modular leading edge 101) that can be assembled in advance and then mounted on the rest of the wing. The provision of a modular leading edge may also facilitate efficient assembly by enabling a reduction in the number of attachments between the sub-assembly (the leading edge) and the main assembly and/or reduce the need to accommodate tolerance gaps which may become significant when connecting large numbers of components together. The rotatable nature of the modular leading edge may facilitate inspections and maintenance by providing improved access to the interior of the wing tip 100 when the modular leading edge 101 is in the installation position.

Figure 5:
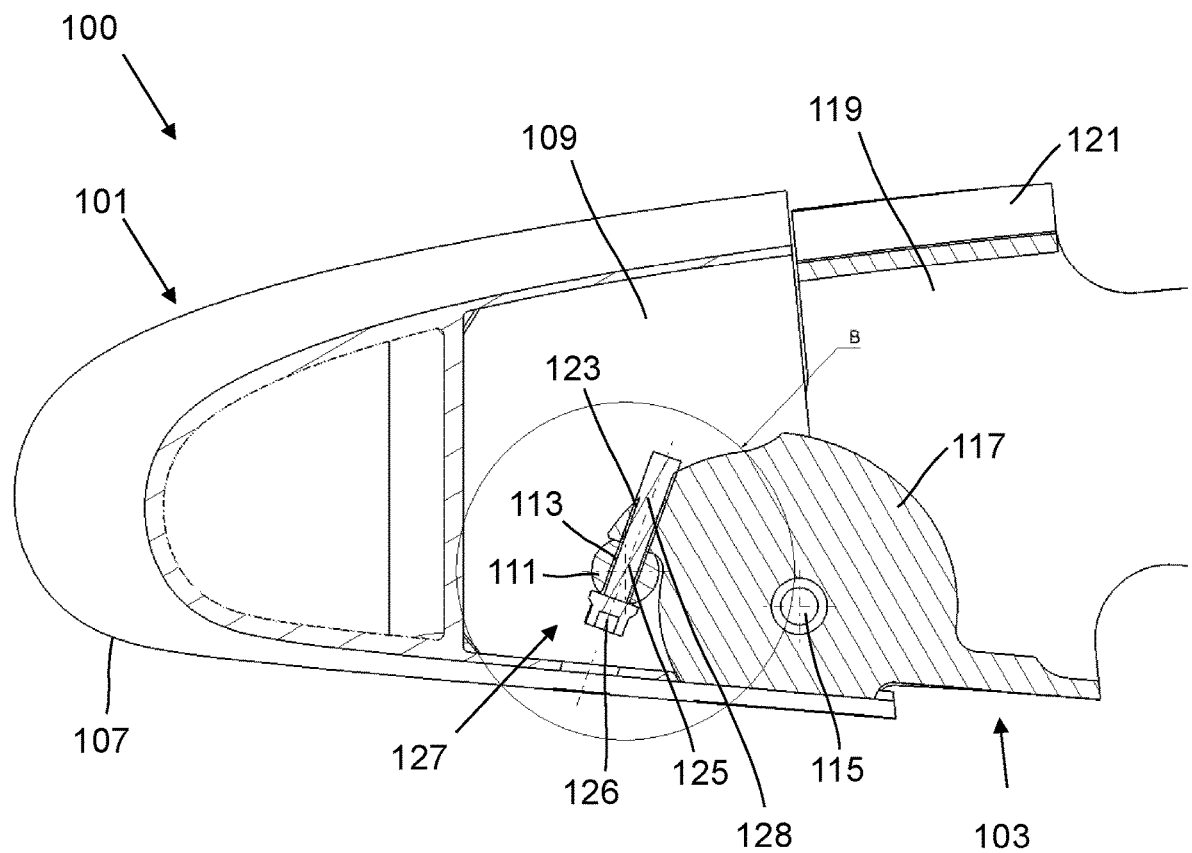
FIG. 5 shows a cross-sectional view of a portion of the wing tip of FIG. 3.

FIG. 5 shows a cross-sectional view through a portion of the wing tip 100 of the first embodiment when the modular leading edge 101 is in the operational position. The modular leading edge 101 is shown on the left-hand side of FIG. 5 and comprises a curved outer cover 107 supported by an edge rib 109. A spigot 111 (shown in cross-section in FIG. 5) is attached to the edge rib 109. A threaded bore 113 extends through the spigot 111 in a direction perpendicular to the longitudinal axis of the spigot 111. An attachment bolt 115 pivotally connects the edge rib 109 to an end portion 117 of a wing rib 119 which forms part of the wing box 103. The wing rib 119 supports an upper cover 121 of the wing box 103. The end portion 117 of wing rib 119 has a threaded recess 123 formed therein. A tension bolt 125 has a head 126 on the lower side of spigot 111 and a body 128 extending upward from the head 126, through the bore 113 in spigot 111, and into box-recess 123 to form a tension joint 127.

Figure 6:
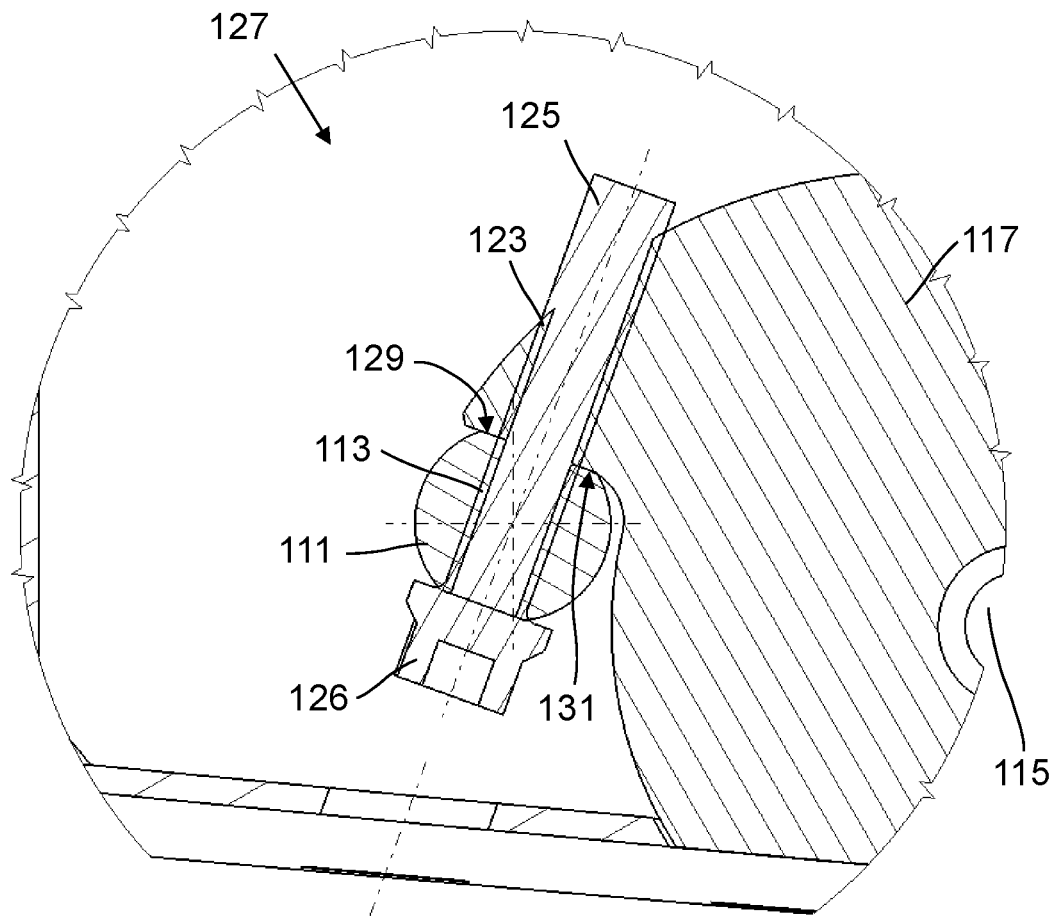
FIG. 6 shows a close-up view of the region labelled B in FIG. 5.

FIG. 6 shows a close-up view of the area including tension joint 127 and labelled 'B' in FIG. 5. As shown in FIG. 6 the cross-section of the spigot 111 is in the form of a truncated circle, with two flat faces 129 located either side of the spigot 111, the spigot bore 113 extending through the centre of each face 129 and through the centre of the spigot 111. Each flat face 129 extends over a portion of the surface of the spigot 111 in a plane substantially parallel to the longitudinal axis of the bore 113 that extends through the spigot 111. In the operational position of FIG. 4, a flat face 131 formed on an end portion 117 of the wing rib 119 contacts one of the flat faces 129 of the spigot 111. The two faces 129, 131 are in an abutting relationship, with contact between the two faces 129, 131, over the majority of the surface area of the flat face 129.

In use, each attachment bolt 115 provides a pivotal mounting about a stationary rotational axis for the modular leading edge 101 on the wing box 103, allowing the modular leading edge 101 to rotate between an operational position (shown in FIGS. 3 and 5), in which the modular edge 101 forms the leading edge of the wing 2, and an installation position (shown in FIG. 4), in which the leading edge 101 is rotated approximately 90 degrees downwards. Together, the attachment bolts 115a-e constrain the movement of the modular leading edge in all degrees of freedom apart from the rotational degree of freedom that allows for rotation of the modular leading edge 101 between the installation and operation positions. In use, when the modular leading edge is in the operational position tensioning the bolt 125 presses the spigot-side contact face 129 and the box-side contact face 131 together such that between them bolt 125, contract face 129 and contact face 131 form a tension joint 127 which resists rotation of the leading edge about the attachment bolt 115 in both directions (clockwise and anti-clockwise as viewed in FIGS. 5 and 6). Torque loading on the leading edge 101 about the attachment bolt 115 in a clockwise direction is reacted by compression of the spigot contact face 129 and the box contact face 131. Torque in an anti-clockwise direction is reacted by tension between the tension bolt 125 and the box-recess 123. The combination of an attachment bolt and tension joint in accordance with the first embodiment allows the modular leading edge 101 to be used on a wing having a curved (rather than straight) leading or trailing edge. Thus, arrangements in accordance with the present example embodiment may facilitate the use of a modular leading edge with a wide variety of wing types. Furthermore, arrangements in accordance with the present embodiment may allow mounting and fixing of the modular leading edge relative to the rest of the wing in a space efficient and mechanically simple manner. Furthermore, the tension bolt 125 of the first embodiment is orientated such that it may be accessible through an opening in a lower cover of the wing tip 100 (not shown). Placing the opening on the underside of the wing tip 100 has a reduced effect on the wing tip aerodynamics than an equivalent opening on the topside of the wing tip 100, thus, wing tips in accordance with the present embodiment may allow for provision of a modular leading edge while reducing the impact on the aerodynamic performance of the wing.

In use, spigot 111 is mounted to allow a small amount of rotation, about the longitudinal axis of the spigot 111, relative to the edge rib 109. This may allow the spigot 111 to rotate as the tension bolt 125 is inserted and tensioned to bring the contact faces 129, 131 into a good contact, thereby accommodating small misalignments between wing rib 119 and edge rib 109. Thus, arrangements in accordance with the present example embodiments may facilitate faster assembly of the wing assembly, by automatically accommodating small misalignments.

Figure 7:
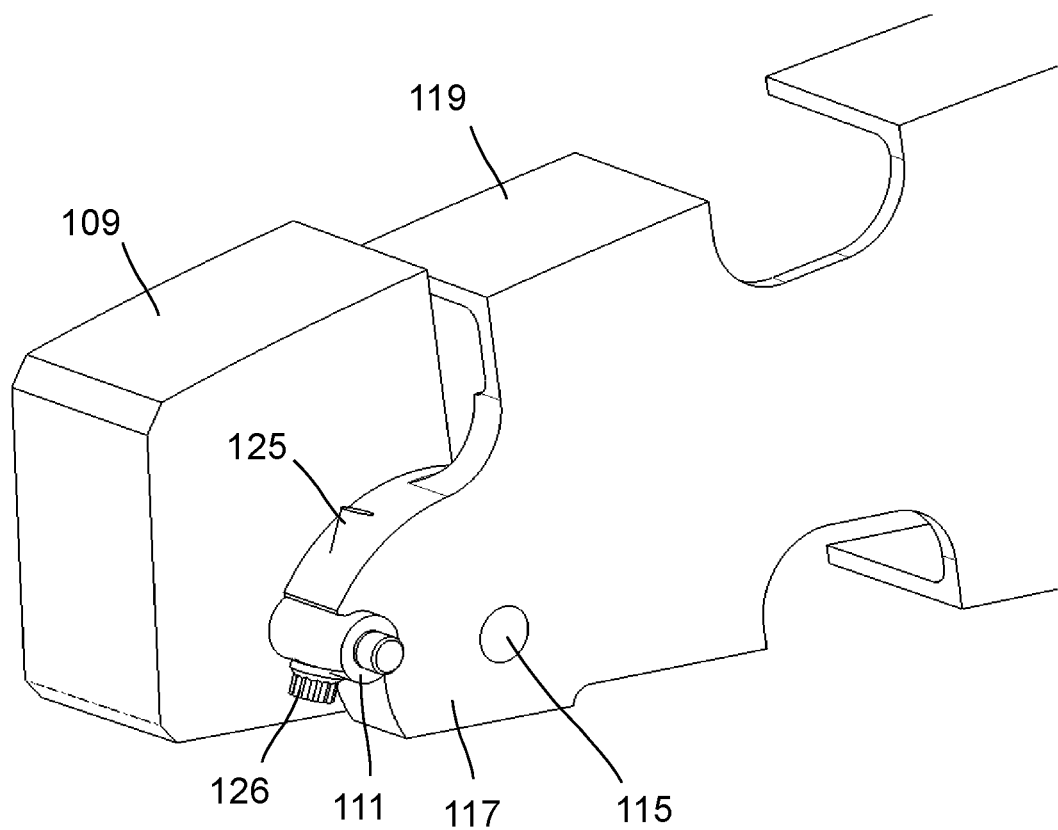
FIG. 7 shows a perspective view of a portion of the wing tip of the first embodiment.
Figure 8:
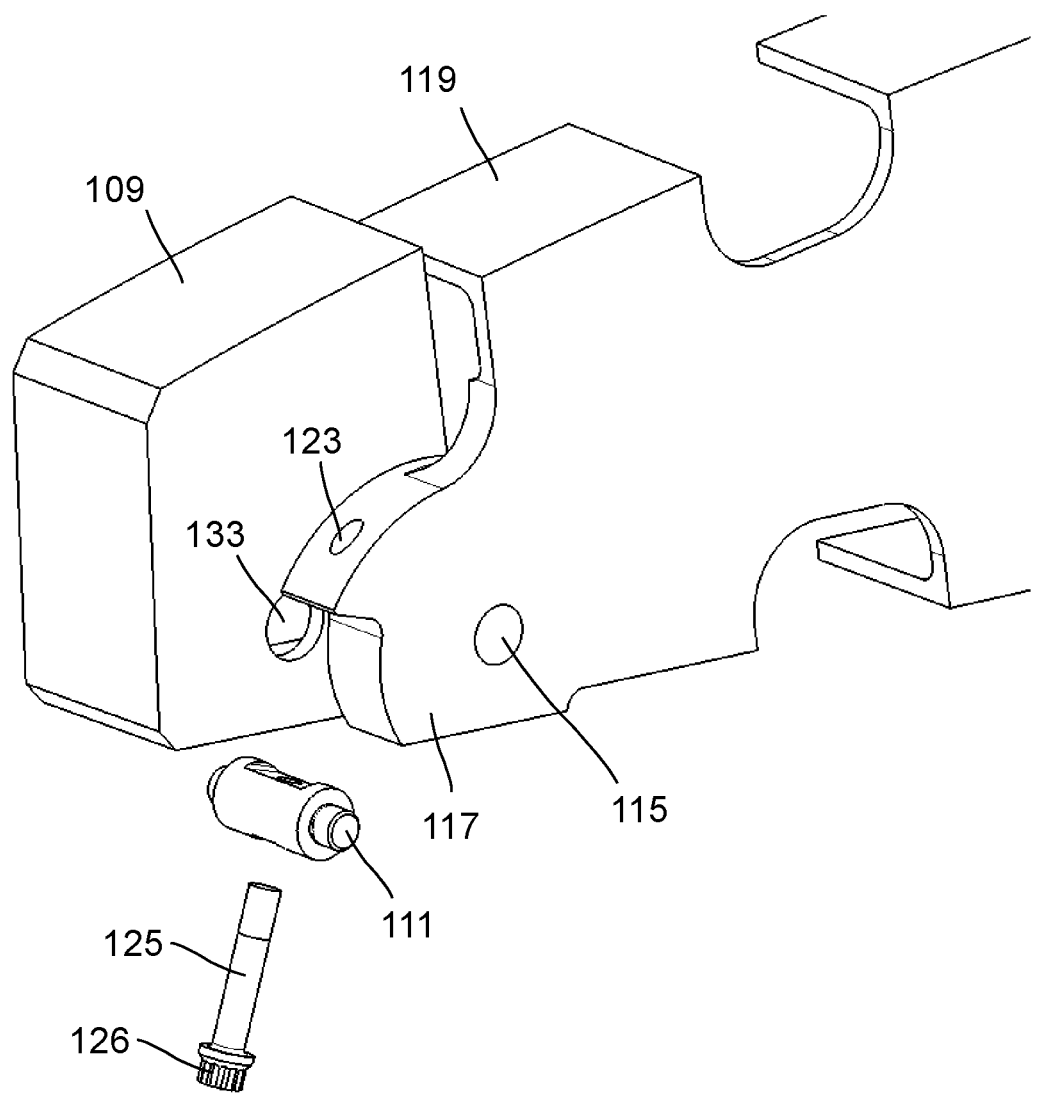
FIG. 8 shows an exploded view of the portion of the wing tip shown in FIG. 7.

FIG. 7 shows a perspective view of a portion of the wing of the first embodiment, with the tension joint 127 assembled. FIG. 8 shows an exploded view of the tension joint 127 of FIG. 6.

Figure 9:
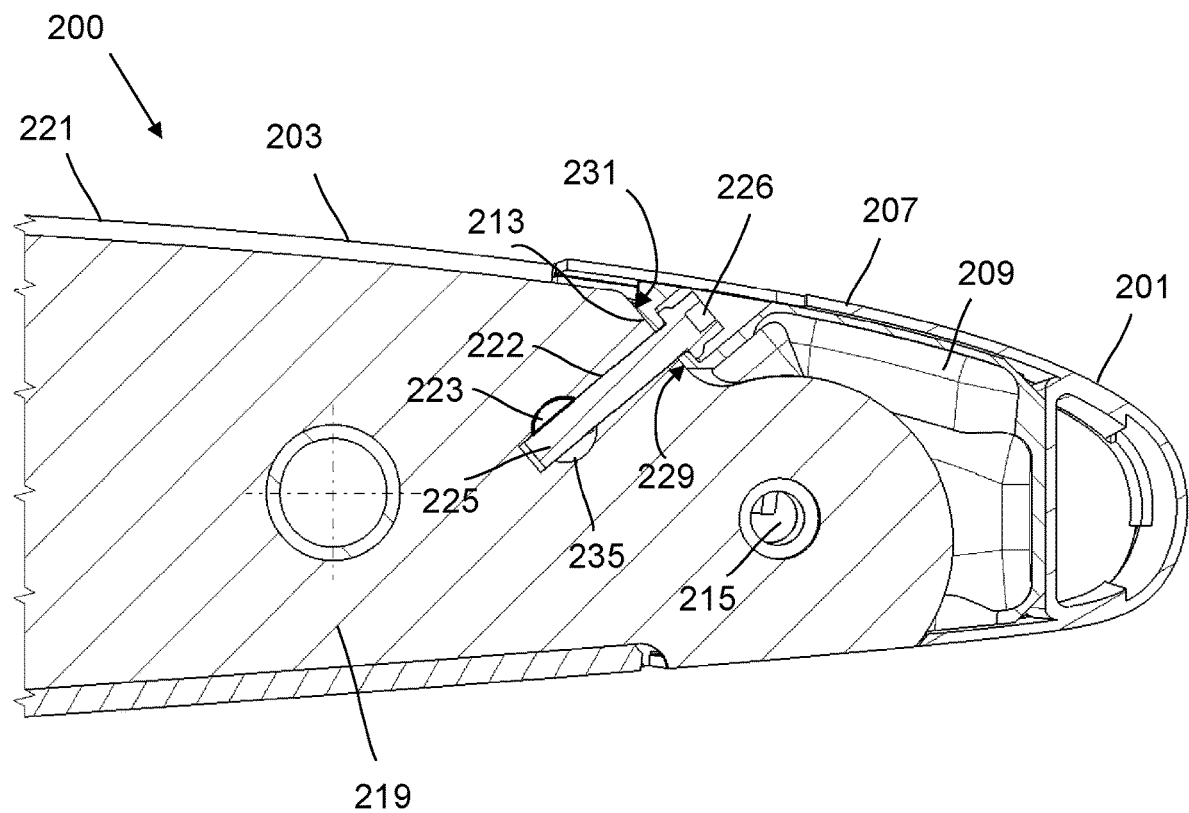
FIG. 9 shows a cross-sectional view of a portion of a wing tip according to a second embodiment of the invention.

FIG. 9 shows a wing tip 200 according to a second example embodiment of the invention when the modular leading edge 201 is in the operational position. Only those aspects of the present embodiment which differ with respect to the first embodiment will be discussed here. Similar reference numerals denote similar elements. The leading edge 201 of the second embodiment is shown on the right-hand side of the wing box 203 in FIG. 9. In contrast to the first embodiment where the tension bolt 125 is received in a recess 113 formed in a spigot 111 mounted on the edge rib 109, in the second example embodiment of the invention the tension bolt 225 is received in a threaded recess 223 formed in a barrel nut 235. The barrel nut 235 is mounted in a hole 237 (shown in FIG. 10) in the wing-box rib 219. A linking recess 222 extends from a flat surface 229 on the upper side of the wing-box rib 219 and is coaxial with the recess 223 in barrel nut 235. The head 226 of the tension bolt 225 is located on the upper side of the wing tip 200, the body of the tension bolt 225 extending downwards through a recess 213 formed in the leading-edge rib 209 through the recess 222 and into the threaded recess 223 formed in the barrel nut 235. Flat surface 229 abuts flat surface 231 on the upper surface of leading-edge rib 209. In the second embodiment the tension bolt 225 is orientated so that it may be accessible through an opening (not shown) in the upper cover 221 of the wing tip 200. As discussed above, placing the opening on the topside of the wing tip 200 may have a greater effect on the wing tip aerodynamics than an equivalent opening on the underside of the wing tip. However, where space is limited, for example towards the outboard end of a wing, the use of a barrel nut in place of a spigot may allow for a tension joint to be provided in a more space-efficient manner. Assemblies in accordance with the present embodiment may therefore facilitate use of a modular leading edge in regions of the wing having reduced thickness.

Figure 10:
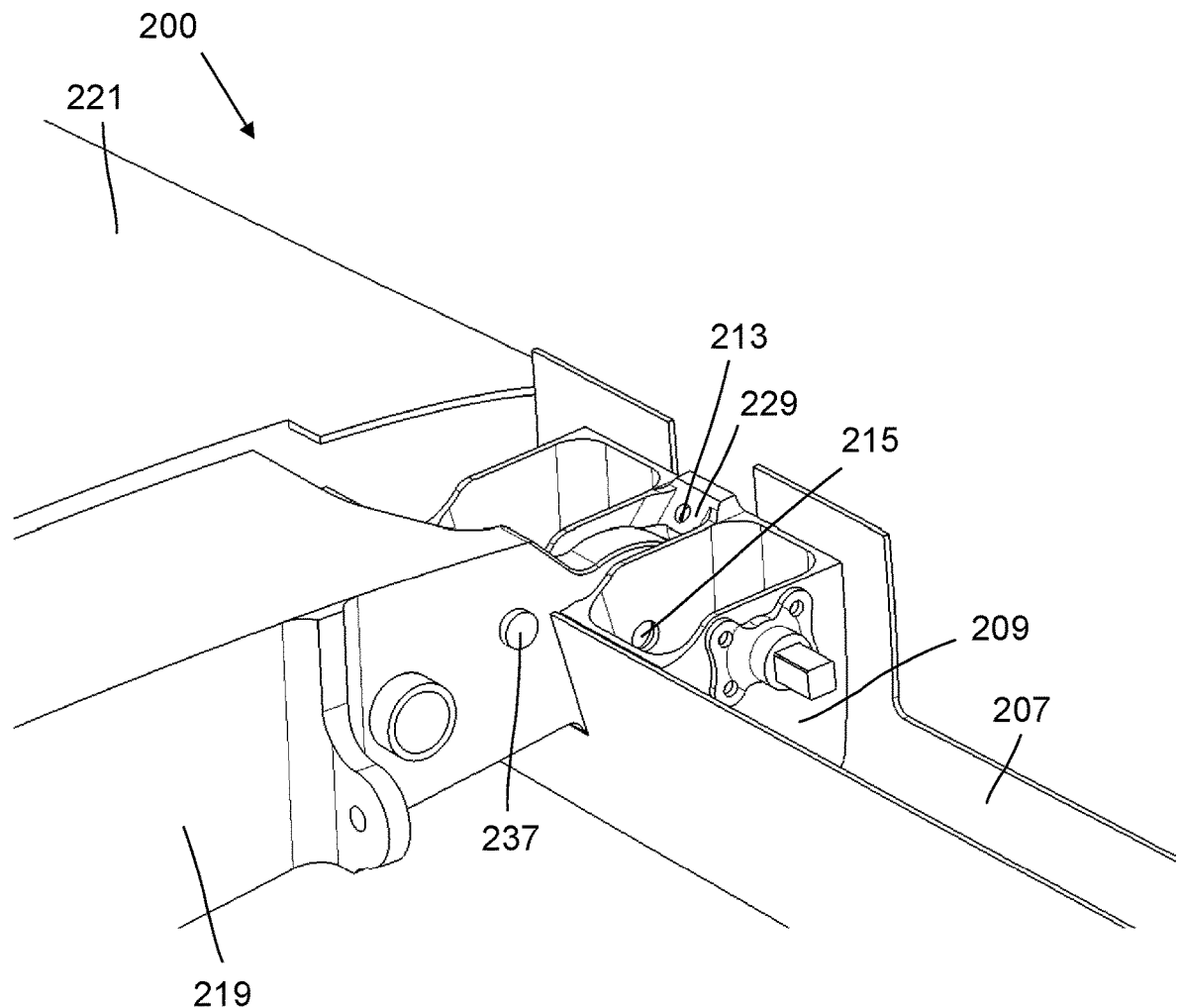
FIG. 10 shows a perspective view of the wing tip of FIG. 9, with the modular leading edge in the installation position.
Figure 11:
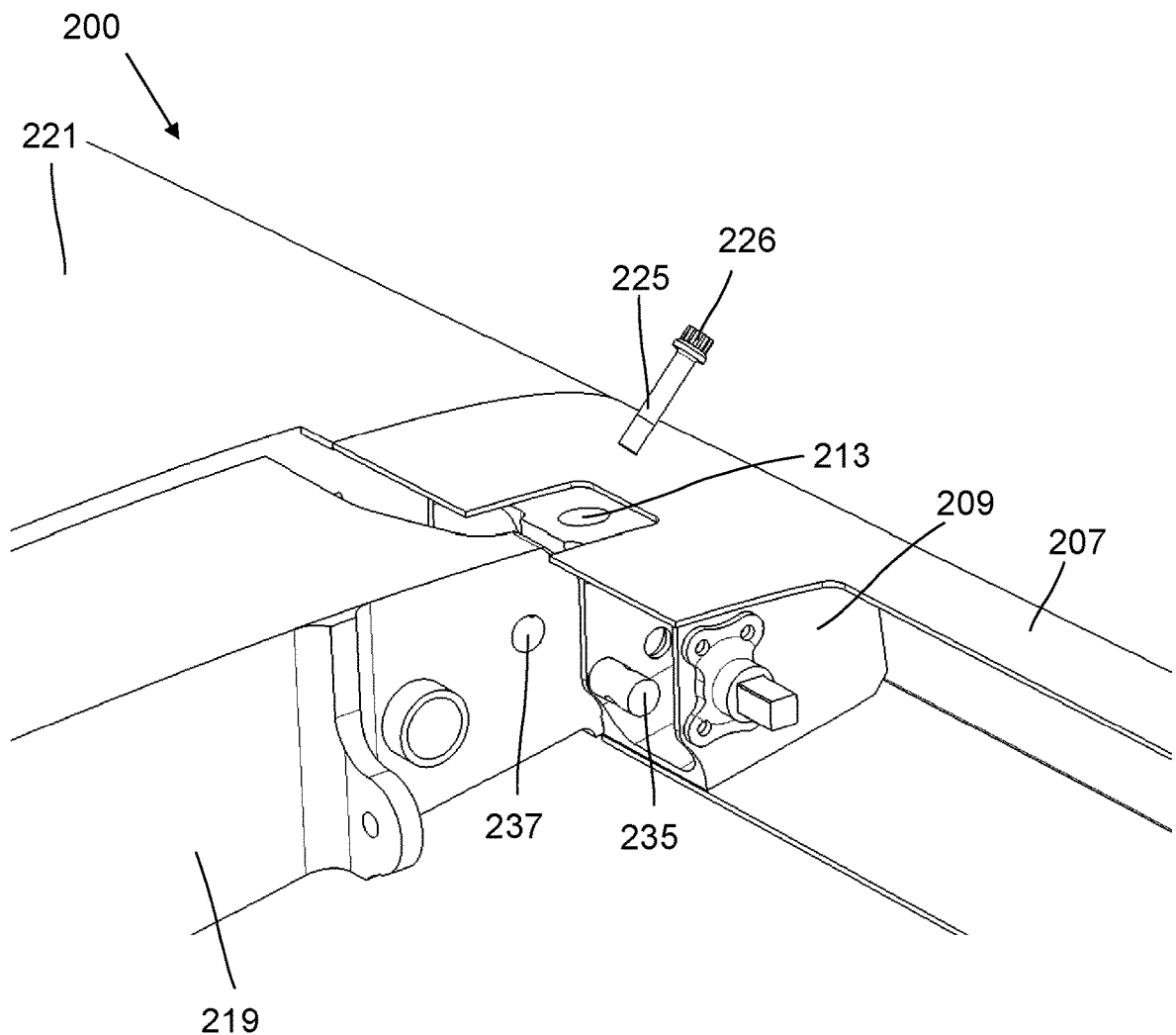
FIG. 11 shows a perspective view of the wing tip of FIG. 9, with the modular leading edge in the operational position.

FIG. 10 shows a perspective view of the wing tip 200 of the second example embodiment, when the leading edge 201 is in the installation position. In the installation position, the leading edge 201 points downwards, such that the outer cover 207 of the leading edge 201 faces approximately 90° off angle from the in-flight direction of travel of the wing tip. In FIG. 11 the leading edge 201 is in the operational position FIG. 11 shows an exploded perspective view of the wing tip 200 in the operational position. In the operational position the curved outer cover 207 of the leading edge 201 is aligned with the upper cover 221 of the wing box 203, such that the outer cover 207 of the leading edge 201 faces the incident airflow when in flight. Barrel nut 235 is shown aligned with hole 237. Tension bolt 225 is shown aligned with edge-recess 213 and box recess 223. In use, to lock the leading edge in the operational position, the barrel nut 235 is inserted into hole 237, and then tension bolt 225 is inserted through edge-recess 213 and box recess 223 (hidden from view in FIG. 11) and is received in tension the threaded recess 223 of barrel nut 235.

In a third example embodiment, not shown, a single wing tip includes connections between the modular leading edge and the wing box in accordance with both the first and second embodiments. In the third embodiment the connection between the modular leading edge and the wing box at the outermost wing rib is a barrel nut arrangement in accordance with the second embodiment, while the other connections between the modular leading edge and the wing box use a spigot in accordance with the first example embodiment.

FIG. 12 shows a flow chart illustrating the steps of a method 450 for assembling a wing assembly according to any previous embodiment of the invention. The modular edge is first attached 451 to the main structure in an installation position, using an attachment bolt. The modular edge is then rotated 452 through 90 degrees, about the attachment bolt, to an operational position, in which the modular leading edge forms the leading edge of the wing and a portion of the modular edge is brought into an abutting relationship with a corresponding portion of the wing box. A tension bolt is then inserted 453 into a threaded recess on the both the modular leading edge and the wing box to form a tension joint. The tension bolt is then tightened 454 until a predetermined torque value is reached. Tightening 454 the tension bolt draws the abutting portions of the wing box and modular leading edge together. Once tightened, rotation of the modular leading edge away from the operational position is prevented in one direction between the abutting portions of the modular leading edge and the wing box, and in the other direction by the engagement between the bolt and one of the threaded recesses. Methods in accordance with the present example embodiment of FIG. 12 may provide a simple and efficient way of accurately assembling a wing assembly and/or preventing movement of a modular leading edge relative to the rest of the wing assembly.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above embodiments have been described with reference to a modular leading edge, but it will be appreciated the mounting and fixing arrangement described above may also be used with a modular trailing edge. The arrangements described above have been described with reference to a wing tip, but may also be used to provide modular edge assemblies in other areas of the wings, tailplanes or other aerofoil bodies on the aircraft.

The above embodiments have been described with reference to a modular leading edge that rotates downwards from the operational position to the installation position, but it will be appreciated that the modular edge may rotate upwards when moving from the operational position into the installation position. The installation position may be at an angle other than approximately 90° from the operational position.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A wing assembly, the wing assembly comprising:
a main structure comprising a first contact face and a first recess arranged to receive a portion of a tension bolt; and
a modular edge comprising a second contact face and a second recess arranged to receive a portion of the tension bolt, the modular edge being pivotally mounted on the main structure for rotation solely about a stationary rotational axis between an installation position, in which the first and second contact faces are spaced apart, and an operational position, in which the first and second contact faces are abutting and the modular edge is aligned with the main structure to form at least part of an edge of the wing assembly, wherein the modular edge is aligned with the main structure to form at least part of the leading edge or trailing edge of the wing when the modular edge is in the operational position; and wherein:
the wing assembly is arranged such that, when the modular edge is in the operational position, tension in the tension bolt received in the first and second recesses acts to press the first and second contact faces together, thereby forming a tension joint that resists pivoting of the modular edge relative to the main structure.

2. A wing assembly according to claim 1, wherein the main structure comprises at least one wing rib, and the first contact face is located on the wing rib.

3. A wing assembly according to claim 2, wherein the first recess is formed in the wing rib.

4. A wing assembly according to claim 2, wherein the main structure comprises a barrel nut mounted on the at least one wing rib, the first recess being formed in the barrel nut.

5. A wing assembly according to claim 1, wherein the modular edge comprises at least one edge rib and the second recess is formed in, and the second contact face is located on, the edge rib.

6. A wing assembly according to claim 1, wherein the modular edge comprises at least one edge rib and a spigot mounted on the edge rib and the second contact face is located on, and the second recess is formed in, the spigot.

7. A wing assembly according to claim 6, wherein the spigot is mounted on the edge rib.

8. A wing assembly according to claim 1, wherein the modular edge is pivotally mounted on the main structure by a fastener.

9. A wing assembly according to claim 1, wherein the main structure comprises a plurality of wing ribs, and is configured such that, in use, a tension joint is formed between the modular edge and each wing rib, each tension joint comprising a first recess and a first contact face forming part of the main structure, a second recess and a second contact face forming part of the modular edge and a tension bolt, each tension bolt being received in a corresponding pair of first and second recesses.

10. An aircraft comprising the wing assembly of claim 1.

11. A method of assembling a wing assembly, the wing assembly comprising:
- a main structure comprising a first recess and a first contact face,
- a modular edge configured to form part of the leading or trailing edge of the wing assembly, the modular edge comprising a second recess and a second contact face, wherein the modular edge is aligned with the main structure to form at least part of the leading edge or trailing edge of the wing when the modular edge is in the operational position, and
- a tension bolt, the method comprising the steps of:
- mounting the modular edge to the main structure in an installation position using one more fasteners, in which the first and second contact faces are spaced apart; and then
- rotating the modular edge from the installation position to an operational position solely in a circular arc about the one or more fasteners, in which the first contact face and the second contact face are abutting; and then
- inserting the tension bolt into the first and second recesses; and then
- tensioning the bolt to press the first and second contact faces together thereby forming a tension joint that resists rotation of the modular edge away from the operational position.

12. A method according to claim 11, wherein the step of rotating the modular edge to an operational position comprises rotating the modular edge through an angle of at least 45 degrees.

13. A method according to claim 11, wherein the step of tensioning the bolt comprises tightening the bolt until a predetermined torque loading is reached.

14. A wing assembly forming at least part of a wing of an aircraft, wherein
- the wing assembly comprises a wing body having a first surface and a modular edge having a second surface, the modular edge being configured to form at least part of one of a leading edge of the wing assembly and a trailing edge of the wing assembly, the modular edge being clamped against the wing body by at least one releasable fixing held in tension, causing the first and second surfaces to be held together in abutting relation, and
- the wing assembly modular edge is mounted on the wing body configured solely for rotation away from the wing body, when the fixing is released, to a position in which the modular edge remains connected to the wing body but with first and second surfaces being held in spaced apart relation.

* * * * *